United States Patent
Tang et al.

(10) Patent No.: US 11,042,167 B2
(45) Date of Patent: Jun. 22, 2021

(54) METHODS AND ASSOCIATED SYSTEMS FOR COMMUNICATING WITH/CONTROLLING MOVEABLE DEVICES BY GESTURES

(71) Applicant: SZ DJI TECHNOLOGY CO., LTD., Shenzhen (CN)

(72) Inventors: Ketan Tang, Shenzhen (CN); Guyue Zhou, Shenzhen (CN); Zhuo Guo, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 135 days.

(21) Appl. No.: 16/251,025

(22) Filed: Jan. 17, 2019

(65) Prior Publication Data
US 2019/0155313 A1     May 23, 2019

Related U.S. Application Data

(63) Continuation of application No. PCT/CN2016/093580, filed on Aug. 5, 2016.

(51) Int. Cl.
*G05D 1/10* (2006.01)
*G05D 1/00* (2006.01)
(Continued)

(52) U.S. Cl.
CPC .......... *G05D 1/101* (2013.01); *B64C 39/024* (2013.01); *G05D 1/0016* (2013.01);
(Continued)

(58) Field of Classification Search
CPC .... G05D 1/101; G05D 1/0016; G05D 1/0094; G06K 9/00389; G06K 9/00335;
(Continued)

(56) References Cited

U.S. PATENT DOCUMENTS

| | | |
|---|---|---|
| 2004/0028260 A1 | 2/2004 | Higaki et al. |
| 2008/0085048 A1 | 4/2008 | Venetsky et al. |

(Continued)

FOREIGN PATENT DOCUMENTS

| | | |
|---|---|---|
| CN | 102542160 A | 7/2012 |
| CN | 102591459 A | 7/2012 |

(Continued)

OTHER PUBLICATIONS

Van den Bergh et al., "Combining RGB and ToF Cameras for Real-time 3D Hand Gesture Interaction", Applications of Computer Vision (WACV), 2011 IEEE Workshop on, IEEE, Jan. 5, 2011, pp. 66-72.*

(Continued)

*Primary Examiner* — Brian P Sweeney
(74) *Attorney, Agent, or Firm* — Finnegan, Henderson, Farabow, Garrett & Dunner, LLP

(57) ABSTRACT

Methods and associated systems and apparatus for controlling a moveable device are disclosed herein. The moveable device includes an image-collection component and a distance-measurement component. A representative method includes generating an image corresponding to the operator and generating a first set of distance information corresponding to the operator. The method identifies a portion of the image in the generated image and then retrieves a second set of distance information from the first set of distance information based on the identified image portion corresponding to the operator. The method then identifies a gesture associated with the operator based on the second set of distance information. The method then further generates an instruction for controlling the moveable device based on the gesture.

21 Claims, 9 Drawing Sheets

(51) Int. Cl.
B64C 39/02 (2006.01)
G06K 9/00 (2006.01)

(52) U.S. Cl.
CPC ....... *G05D 1/0094* (2013.01); *G06K 9/00335* (2013.01); *G06K 9/00389* (2013.01); *B64C 2201/14* (2013.01)

(58) Field of Classification Search
CPC ............. G06K 9/4652; G06K 9/00201; G06K 9/00355; B64C 39/024; B64C 2201/14; G06F 3/017
See application file for complete search history.

(56) References Cited

U.S. PATENT DOCUMENTS

| | | | |
|---|---|---|---|
| 2011/0069866 A1 | 3/2011 | Kim et al. | |
| 2013/0253733 A1* | 9/2013 | Lee | B64C 39/024 701/2 |
| 2015/0326845 A1 | 11/2015 | Liang et al. | |

FOREIGN PATENT DOCUMENTS

| | | |
|---|---|---|
| CN | 104808799 A | 7/2015 |
| CN | 105096259 A | 11/2015 |
| CN | 105589466 A | 5/2016 |
| CN | 105607740 A | 5/2016 |
| CN | 105786016 A | 7/2016 |
| EP | 2 849 150 A1 | 3/2015 |
| JP | 2004-78316 | 3/2004 |
| JP | 2010-239992 | 10/2010 |
| KR | 10-2016-001699 | 1/2016 |
| TW | 201339903 A | 10/2013 |
| WO | WO 2014/106862 A2 | 7/2014 |

OTHER PUBLICATIONS

International Search Report dated May 4, 2017, in International Application No. PCT/CN2016/093580.

Bergh et al., "Combining RGB and ToF Cameras for Real-time 3D Hand Gesture Interaction", Applications of Computer Vision (WACV), 2011 IEEE Workshop on, IEEE, Jan. 5, 2011, pp. 66-72.

Naseer et al., "Interactive Person Following and Gesture Recognition with a Flying Robot", Dec. 31, 2013, Retrieved from the Internet: URL:https://isturm.de/publictations/data/naseer13iros_ws.pdf [retrieved on Apr. 4, 2017], 7 pages.

Tayyab Naseer et al., "FollowMe: Person Following and Gesture Recognition with a Quadrocopter", 2013 IEEE/RSJ International Conference on Intelligent Robots and Systems (IROS), Nov. 3-7, 2013, 9 pages.

Decision to Grant dated Sep. 29, 2020, in corresponding Japanese Application No. 2018-567118.

Shigeo Yoshida et al, "Augmentation of the Embodied Cognition Using a Gesture-Controlled Flying Robot," IPSJ Interaction 2012, Information Processing Society of Japan, Mar. 15, 2012, pp. 403-408 (6 pages).

* cited by examiner

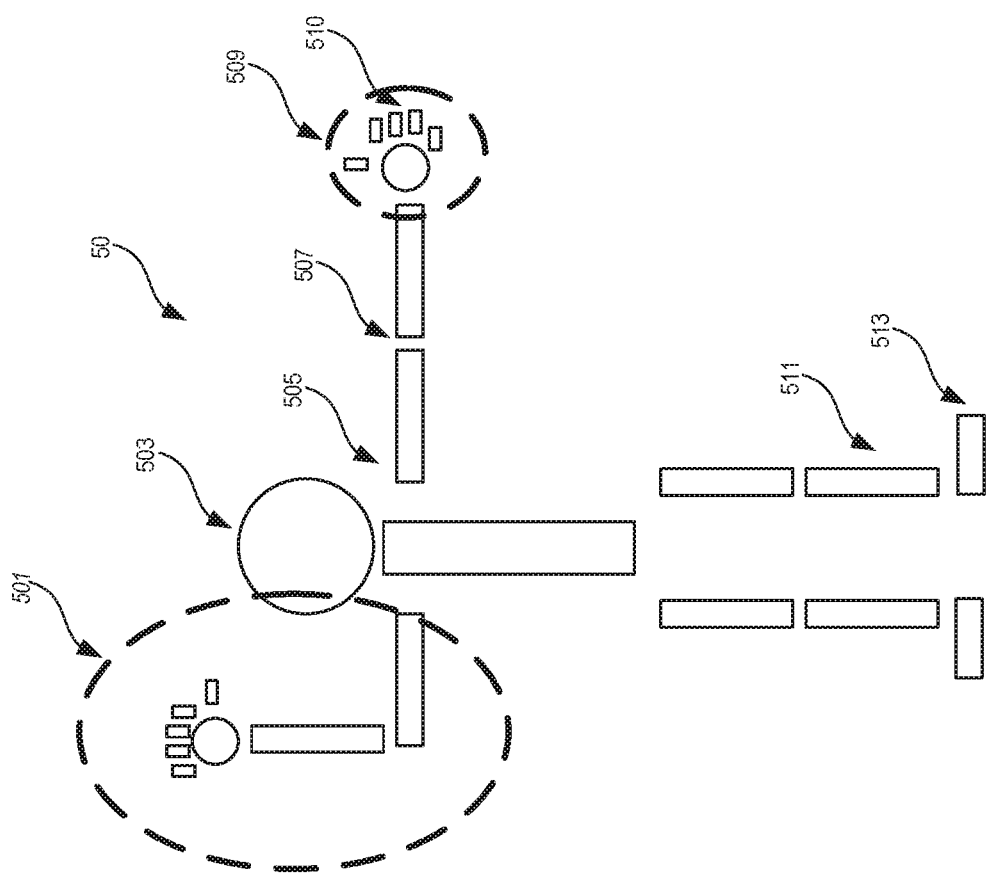

METHODS AND ASSOCIATED SYSTEMS FOR COMMUNICATING WITH/CONTROLLING MOVEABLE DEVICES BY GESTURES

CROSS REFERENCE TO RELATED APPLICATION

The present application is a continuation of International Patent Application No. PCT/CN2016/093580, filed Aug. 5, 2016, which is incorporated herein by reference in its entirety.

TECHNICAL FIELD

The present technology is directed generally to methods and associated systems for communicating with or controlling moveable devices such as an unmanned aerial vehicle (UAV) based at least in part on a set of instructions derived from human gestures.

BACKGROUND

Traditionally, a movable device (such as a UAV) can be controlled by a remote device such as a remote control, a control stick, or a mobile device with certain software applications installed. All of these controlling methods require an additional controlling device. Carrying such a controlling device can be inconvenient to a user. For example, the size of certain controlling devices can be relatively large. Also, a user usually needs to spend some time learning how to control the movable device before he/she can actually control it. In other words, using an additional controlling device to control a movable device is somewhat counterintuitive and sometimes even difficult for some users to learn or master. Therefore, there remains a need for improved methods and systems for controlling a movable device by intuitive and straightforward user commands or instructions.

SUMMARY

The following summary is provided for the convenience of the reader and identifies several representative embodiments of the disclosed technology. Generally speaking, the present technology provides improved methods and associated systems that enable an operator to communicate and control a movable device in a straightforward, easy-to-learn, intuitive fashion. More particularly, the present technology enables an operator to control and communicate with the moveable device by a gesture or body movement. No additional controlling device is required. The associated systems can first collect information associated with the operator, identify gestures based on the collected information, and then generate corresponding instructions to control the movable device.

Representative embodiments of the present technology include a method for controlling a movable device having an image-collection component and a distance-measurement component. The method includes, in response to a request from an operator, generating an image corresponding to the operator by the image-collection component and generating a first set of distance information corresponding to the operator (e.g., a depth image) by the distance-measurement component. The method further identifies a portion of the image corresponding to the operator (e.g., an image of a body part of the operator, an image of the operator, a contour of the operator or the operator's body part, a border line or frame of the operator or the operator's body part, etc.) and retrieves a second set of distance information (e.g., a portion of the depth image associated to a body part of the operator) from the first set of distance information, based at least in part on the identified portion of the image corresponding to the operator. The method then identifies a gesture associated with the operator based at least in part on the second set of distance information and generates an instruction for the device based at least in part on the gesture.

In particular embodiments, the movable device can be an UAV. In some embodiments, the image-collection component can be a color-sensing camera that can be used to collect color images (e.g., those having red, green, and blue (RGB) pixels.) In other embodiments, the image-collection component can be a camera that collects various types of images (e.g., a thermal/infrared camera, a night vison camera, etc.). In some embodiments, the distance-measurement component can be a distance-sensing or depth-sensing camera that can be used to measure distance based on a distance sensor (e.g., a time of flight (ToF) sensor). In particular embodiments, the collected image can be a two-dimensional color image. In some embodiments, the first set of distance information can be a two-dimensional depth image. For example, a depth image can have various types of shadings that indicate different distances between the measured objects (such as the operator) and the distance sensor. Due to the limitations associated with the resolution of the color camera and the distance camera, it is sometimes difficult to identify a gesture by only using one of them. In particular embodiments, the associated system can analyze or compare the two-dimensional color images and the depth images, and effectively identify a gesture of the operator.

In particular embodiments, the identified gesture can include a limb gesture, an arm gesture, a hand gesture, a finger gesture, etc. The associated system can analyze these identified gestures and associate them with corresponding instructions that can be used to control the moving device. For example, the operator can instruct the moveable device to move in a certain direction by positioning his or her arm in the same direction. By doing so, controlling and communicating with the movable device can be convenient and intuitive, and does not require an additional controlling device.

Some embodiments of the present technology can be implemented as methods for configuring a UAV controller. The methods can include programming a computer-readable medium with instructions that, when executed, can generate an image corresponding to an operator and a first set of distance information corresponding to the operator. The instructions can identify a portion of the image corresponding to the operator and retrieve a second set of distance information from the first set of distance information, based at least in part on the identified portion of the image corresponding to the operator. The instructions can identify a gesture associated with the operator based on the second set of distance information and generate an instruction for controlling the UAV based on the gesture. Such methods can include any one or a combination of any of the foregoing elements described above.

BRIEF DESCRIPTION OF THE DRAWINGS

FIG. 5 is a partially schematic diagram illustrating gestures associated with an operator in accordance with representative embodiments of the present technology.

DETAILED DESCRIPTION

1. Overview

Figure 1:
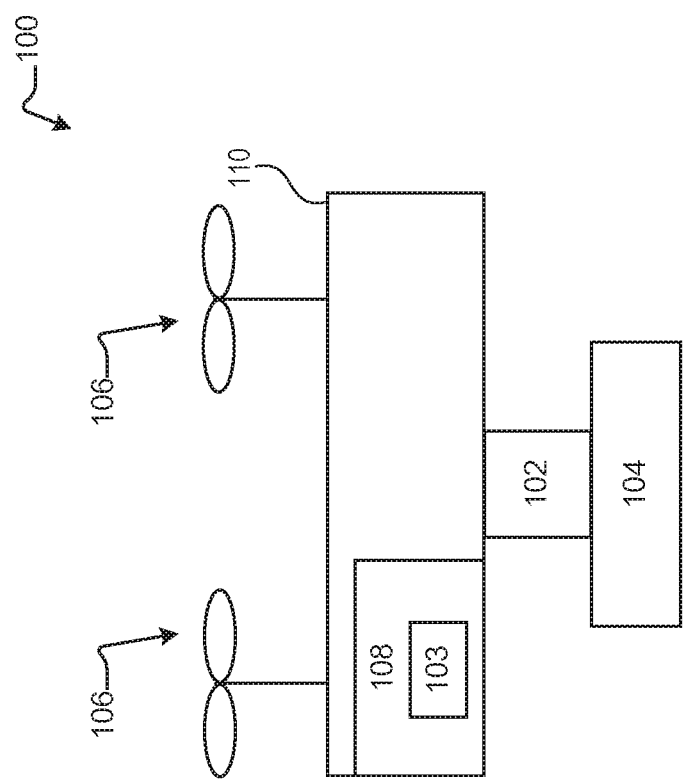
FIG. 1 is a partially schematic, isometric illustration of a UAV having a control system that enables an operator to control the UAV by a gesture in accordance with representative embodiments of the present technology.

The present technology is directed generally to methods and associated systems for communicating with or controlling (or both) moveable devices, such as an unmanned aerial vehicle (UAV), based on a set of pre-determined instructions derived from human gestures. In particular embodiments, the UAV includes an image-collection component configured to collect a color image corresponding to an operator and a distance-measurement component configured to measure the distance between the UAV and the operator. In the collected color image, a body part indicative of a gesture of the operator can be identified. Then the present technology can further identify and confirm the gesture based on the measured distance information. The present technology can then derive an instruction for controlling the UAV. In particular embodiments, the instructions can be formed by a machine learning process or a training classifier.

In some embodiments, the body part can be identified by using a bounding box. For example, the bounding box can be a rectangular-shaped image frame. By positioning the bounding box close to the image portion associated with the operator, the present technology can easily and quickly identify a possible body part that is indicative of the operator's gesture to control the UAV.

The collected color image and the measured distance information can be associated or linked in certain ways. For example, the collected color image can be a two-dimensional image defined by a horizontal axis X and a vertical axis Y. Each point (e.g., pixel) in the two-dimensional image can be identified by the two axes and associated with a set of color information (e.g., in an RGB format). Similarly, the measured distance information can be a two-dimensional depth map defined by the same horizontal axis X and the vertical axis Y (e.g., certain alignment can be performed when initiating the image-collection component and the distance-measurement component). Each point (e.g., pixel) in the two-dimensional depth map can be identified by the two axes and associated with a set of distance information (e.g., using different shadings or colors to indicate distance between the UAV and the operator). Then the present technology can identify a set of corresponding distance information associated with the identified body part. By analyzing both the color image and the depth information of the body part, the present technology can identify a gesture of the operator.

In some embodiments, after a gesture is identified, the present technology can analyze and then determine a type of the gesture of the operator. For example, the associated system can analyze the collected image and measured distance information associated with the gesture and then determine a type of the identified gesture. For instance, the associated system can compare the collected images and measured distance information with reference information or a pre-determined dataset stored in a pre-existing database (e.g., can be a remote database or data storage in the system). The reference information can include various characteristics corresponding to different types of gestures (e.g., a limb gesture, an arm gesture, a hand gesture, a finger gesture, etc.). For example, an arm gesture can include characteristics different from those of a hand gesture (e.g., an arm gesture can have a wider range of distance variation).

In some embodiments, the associated system can be configured to identify a particular type of gesture as a preferred gesture. One factor to consider when determining a type of the preferred gesture is the distance between the moveable device and the operator. For example, when the distance between the moveable device and the operator is within a pre-determined range (e.g., 0.5-1 meter) or less than a threshold value (e.g., 2 meters), the system can select a "hand gesture" as the preferred gesture (i.e., in a short distance mode). This is because the system has a better chance of collecting images of the operator's whole hand than collecting images of the operator's whole arm. For example, in a short distance, it is possible that the image-collection component can only capture a portion of an arm gesture. Similarly, when the distance between the moveable device and the operator is greater than the pre-determined range, the system can select an "arm gesture" as the preferred gesture (i.e., in a long distance mode). This is because the system may not be able to collect a high-quality (e.g., high resolution) image corresponding to the operator's hand. By doing so, the present technology enables the operator to effectively control and communicate with the moveable device based on identified gestures in various distance ranges.

In particular embodiments, before the operator starts to actually control or communicate with the moveable device, the operator can send a request to the associated system based on his/her gestures. For example, the operator can upwardly position and wave his/her arms to form the request to the associated system. After identifying the operator's gesture request (e.g., by analyzing the collected images and measured distance information corresponding to the operator), the associated system can start to enable the operator to control the moveable device. In some embodiments, the associated system can verify the identity of the operator by recognizing a certain gesture. For example, the operator may need to form a predetermined gesture (or a combination of gestures) to "unlock" the associated system. This feature can provide additional security to the associated system and the moveable device. In other embodiments, the associated system can verify the identity of the user based on a security device (e.g., a facial recognition device, a finger print reader, an audio recognition device, etc.) associated with the system.

In some embodiments, the associated system of the present technology can work together with an additional controller (such as a smartphone with a particular app designed for controlling the moveable device, a remote control sticker for the moveable device, etc.). In some embodiments, the operator can be selected or identified via the additional controller (e.g., via a user interface provided by the app installed in the smartphone). In some embodiments, the identity of the operator can be verified by the additional controller (e.g., a security device associated with the additional controller).

The present technology also enables the associated system to generate a set of reference information associated with operator's gestures and corresponding instructions or commands by a machine learning process (or a training classifier). Examples of the machine learning process include methods/algorithms associated with convolutional neural network (CNN) simulation, Random Forest (RF) calculation, finite state machine (FSM) automata, etc. The learning process can be performed by a specific training component including, but not limited to, a programmed chip with a set of instructions, a computer application, a smartphone app, software, firmware, etc.

In particular embodiments, the present technology can verify the identified gestures prior to generating the instruction for the moveable device. For example, the system can keep tracking and store the images (e.g., which can be color images or distance images) associated with the identified gestures for a certain period of time. In some embodiments, these images can be stored in a data storage of the associated system (e.g., a memory, a disk drive, a flash drive, a logical partition, a buffer, etc.). The present technology can analyze these stored images and check for consistency of the gestures derived from these images. For example, it is possible that the operator inadvertently forms a gesture but he/she didn't intend to make the gesture to control the moveable device. This consistency analysis can enhance the accuracy of control by the associated system and accordingly provide better user experience.

Unlike conventional systems, aspects of the present technology are directed to enabling an operator to control, interact with, and communicate with a moveable device without requiring an additional controlling device (however, the associated system is capable of working together with an additional controller, as discussed above). Accordingly, this approach can improve the convenience of operating a moveable device and thus provide better user experience than traditional ways. More particularly, the present technology enables the operator to control the moveable device by his or her gestures. The gestures can be identified and analyzed based on collected images and distance information associated with the operator. By cross-referencing the collected images and the distance information, the present technology can effectively generate instructions for controlling the moveable device.

Several details describing structures or processes that are well-known and often associated with UAVs and corresponding systems and subsystems, but that may unnecessarily obscure some significant aspects of the disclosed technology, are not set forth in the following description for purposes of clarity. Moreover, although the following disclosure sets forth several embodiments of different aspects of the technology, several other embodiments can have different configurations or different components than those described in this section. Accordingly, the technology may have other embodiments with additional elements or without several of the elements described below with reference to FIGS. 1-7.

FIGS. 1-7 are provided to illustrate representative embodiments of the disclosed technology. Unless provided for otherwise, the drawings are not intended to limit the scope of the claims in the present application.

Many embodiments of the technology described below may take the form of computer- or controller-executable instructions, including routines executed by a programmable computer or controller. Those skilled in the relevant art will appreciate that the technology can be practiced on computer or controller systems other than those shown and described below. The technology can be embodied in a special-purpose computer or data processor that is specifically programmed, configured or constructed to perform one or more of the computer-executable instructions described below. Accordingly, the terms "computer" and "controller" as generally used herein refer to any data processor and can include Internet appliances and handheld devices (including palmtop computers, wearable computers, cellular or mobile phones, multi-processor systems, processor-based or programmable consumer electronics, network computers, mini computers, a programmed computer chip, and the like). Information handled by these computers and controllers can be presented at any suitable display medium, including a CRT display or an LCD. Instructions for performing computer- or controller-executable tasks can be stored in or on any suitable computer-readable medium, including hardware, firmware or a combination of hardware and firmware. Instructions can be contained in any suitable memory device, including, for example, a flash drive, USB device, or other suitable medium. In particular embodiments, the term "component" can be hardware, firmware, or a set of instructions stored in a computer-readable medium.

2. Representative Embodiments

FIG. 1 is a partially schematic, isometric illustration of a representative UAV 100 configured in accordance with embodiments of the present technology. The UAV 100 can include an airframe 110 that can in turn include a central portion and one or more outer portions. In particular embodiments, the airframe 110 can include four outer portions (e.g., arms) that are spaced apart from each other as they extend away from the central portion. In other embodiments, the airframe 110 can include other numbers of outer portions. In any of these embodiments, individual outer portions can support components of a propulsion system that drives the UAV 100. For example, individual arms can support corresponding individual motors that drive corresponding propellers 106.

The airframe 110 can carry a payload 104, for example, an imaging device. In particular embodiments, the imaging device can include an image camera (e.g., a camera that is configured to capture video data, still data, or both) and a distance camera (e.g., a camera having a distance sensor, such as a time-of-flight (ToF) sensor, that can measure a distance between two objects). The image camera can be sensitive to wavelengths in any of a variety of suitable wavelength bands, including visual, ultraviolet, infrared or combinations thereof. In still further embodiments, the payload 104 can include other types of sensors, other types of cargo (e.g., packages or other deliverables), or both. In many of these embodiments, the payload 104 is supported relative to the airframe 110 with a gimbal 102 that allows the payload to be independently positioned relative to the airframe 110. Accordingly, for example when the payload 104 includes the imaging device 131, the imaging device can be moved relative to the airframe 110 to track a target. More particularly, for example, the imaging device can be rotated by an angle (referred to as a "cradle angle") relative to the airframe 110 (or relative to other reference planes such as a horizontal plane). In some embodiments, the images collected by the image device can be adjusted based on the cradle angle. Associated image adjustment will be discussed in greater detail below with reference to FIGS. 3B and 3C. When the UAV 100 is not in flight, a landing gear can support the UAV 100 in a position that protects the payload 104.

In a representative embodiment, the UAV 100 includes a controller 108 carried by the UAV 100. The controller 108 can include an on-board computer-readable medium 103 that executes instructions directing the actions of the UAV 100, including, but not limited to, operation of the propulsion system and the imaging device. In particular embodiments, an operator can control the UAV 100 remotely by his/her gestures identified by the image device. Embodiments associated with the gesture identification will be discussed in detail below. The on-board computer-readable medium 103 can be removable from the UAV 100.

Figure 2:
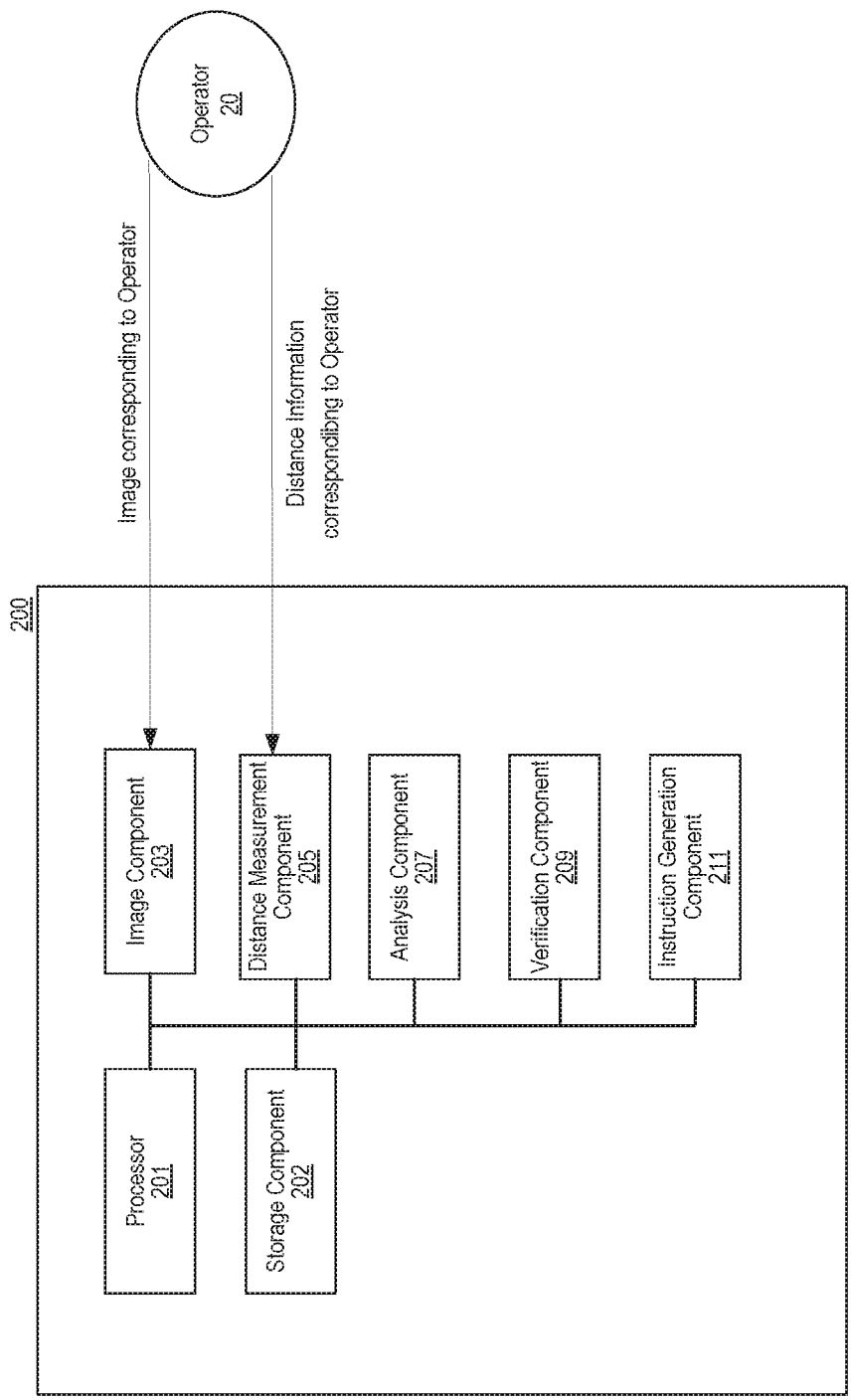
FIG. 2 is a partially schematic block diagram illustrating a system in accordance with representative embodiments of the present technology.

FIG. 2 is a partially schematic block diagram illustrating a system 200 configured in accordance with representative embodiments of the present technology. In some embodiments, the system 200 can be an apparatus having a computer-readable media to store information/instructions associated with the components of the system 200. In particular embodiments, the system 200 is configured to collect image and distance information from an operator 20. The collected images and distance information are used to control a moveable device (such as a UAV) associated with the system. In some embodiments, the system 200 can be installed or carried by the moveable device. In other embodiments, the system 200 (or portions of the system 200) can be positioned apart from the moveable device, e.g., at a remote processor location. A shown in FIG. 2, the system 200 includes a processor 201, a storage component 202, an image component 203, a distance-measurement component 205, an analysis component 207, a verification component 209, and an instruction generation component 211. As shown, the processor 201 is coupled and configured to control the other components of the system 200. The storage component 202 is configured to, permanently or temporarily, store information collected or generated by the system 200. In particular embodiments, the storage component 202 can include a disk drive, a hard disk, a flash drive, a memory, or the like.

The image component 203 is configured to collect images external to the system 200. In particular embodiments, the image component 203 is configured to collect images corresponding to the operator 20. In some embodiments, the image component 203 can be a camera that can collect two-dimensional images with red, green, and blue (RGB) pixels (an example of the two-dimensional image is described further below with reference to FIG. 4A). The collected images can be stored in the storage component 202 for further processing/analysis. In other embodiments, the image component 203 can be a thermal image camera, night version camera, or any other suitable device that are capable of collecting images corresponding to the operator.

In particular embodiments, the distance-measurement component 205 is configured to measure a distance between the operator 20 and the system 200. In some embodiments, the distance-measurement component 205 can includes a time-of-flight (ToF) sensor that measures a distance between objects by emitting/receiving suitable signals (light, laser, etc.). In some embodiments, the distance-measurement component 205 can be or include a distance camera. In other embodiments, the distance measurement component 205 can be or include any suitable device that can generate a two-dimensional distance/depth image associated with the operator 20. An example of a two-dimensional distance/depth image is described further below with reference to FIG. 4B. The collected distance information can be stored in the storage component 202 for further processing/analysis.

The collected images and the measured distance information can be related or associated such that the system 200 can utilize both to identify (and, optionally, verify) a gesture by the operator. For example, in some embodiments, the coordinate axes of a collected two-dimensional image can be related to the coordinate axes of a two-dimensional distance/depth image. By doing so, the system 200 can obtain the distance information of a given pixel located in the collected image, and vice versa (i.e., the system can obtain the color information of a given pixel in the distance/depth image). Related embodiments will be discussed in detail with reference to FIGS. 4A and 4B below.

In particular embodiments, the analysis component 207 is configured to analyze the collected images and measured distance information corresponding to the operator 20. The system 200 first identifies the operator in the collected image. In some embodiments, the operator in the collected image can be identified by a pixel analysis (e.g., distinguishing pixels corresponding to the operator from pixels corresponding to an image background). In some embodiments, the operator in the collected image can be identified based on a body contour (e.g., a body contour corresponding to a user in a thermal image). In some embodiments, the operator in the collected image can be identified by positioning (or overlapping) a bounding box on the collected image (e.g., a bounding box shown in FIGS. 4A and 4B, to be discussed in greater detail below). In such embodiments, the system 200 can use the bounding box to further identify a gesture of the operator in the collected image. For example, the analysis component 207 can identify a gesture based on an intersection (e.g., the intersection 409 in FIG. 4A) between a border line of the identified operator image portion and the bounding box (details to be discussed with reference to FIGS. 4A and 4B below).

Once the operator in the collected image is identified, in some embodiments, the analysis component 207 can then analyze the measured distance information that corresponds to the operator (e.g., a portion of the whole two-dimensional depth image) to identify a gesture of the operator. For example, the analysis component 207 can first identify several body parts of the operator (e.g., a head, a shoulder, an arm, a joint, a leg, a hand, a foot, a finger, etc.) in a two-dimensional depth image. The analysis component 207 can then identify a gesture. In some embodiments, the analysis component 207 can look for a particular type of gesture. For example, the analysis component 207 can focus on identifying an arm gesture when the system 200 is in a long distance mode. As another example, the analysis component 207 can focus on identifying a hand gesture when the system 200 is in a short distance mode. In some embodiments, the analysis component 207 can identify a gesture of the operator, based on a machine learning process involving CNN simulation, RF calculation, FSM automata, etc.

Once the gesture is identified, the distance/depth information associated with the identified gesture will be further processed by the instruction generation component 211. In some embodiments, the instruction generation component 211 can generate the instruction based on a machine learning process involving CNN simulation, RF calculation, FSM automata, etc., or based on a training classifier.

In particular embodiments, the verification component 209 is configured to verify the consistency of the identified gesture. The verification component 209 can first track images associated with the identified gesture (e.g., including both color images and depth images) for a period of time (e.g., 1 to 5 seconds) and store these images (e.g., store multiple associated image frames and distance-image frames). The verification component 209 can analyze the stored images to see if the identified gesture in these images is consistent from one frame to another. If so, the system 200 can move forward with the instruction generation component 211 forming a corresponding instruction based on the identified gesture. If not, the system 200 can notify the operator (e.g., with a visual or audio signal indicating that the "gesture cannot be identified") or proceed to identify another gesture. In some embodiments, the verification component 209 can verify the identified gesture by comparing it with reference information (e.g., a reference set of hand gesture depth information from multiple operators) located in a (remote or local) database. The verification component 209 performs a gate-keeping task to ensure the accuracy of the gesture identification process and accordingly the instruction generation process performed by the system 200.

Figure 3A:
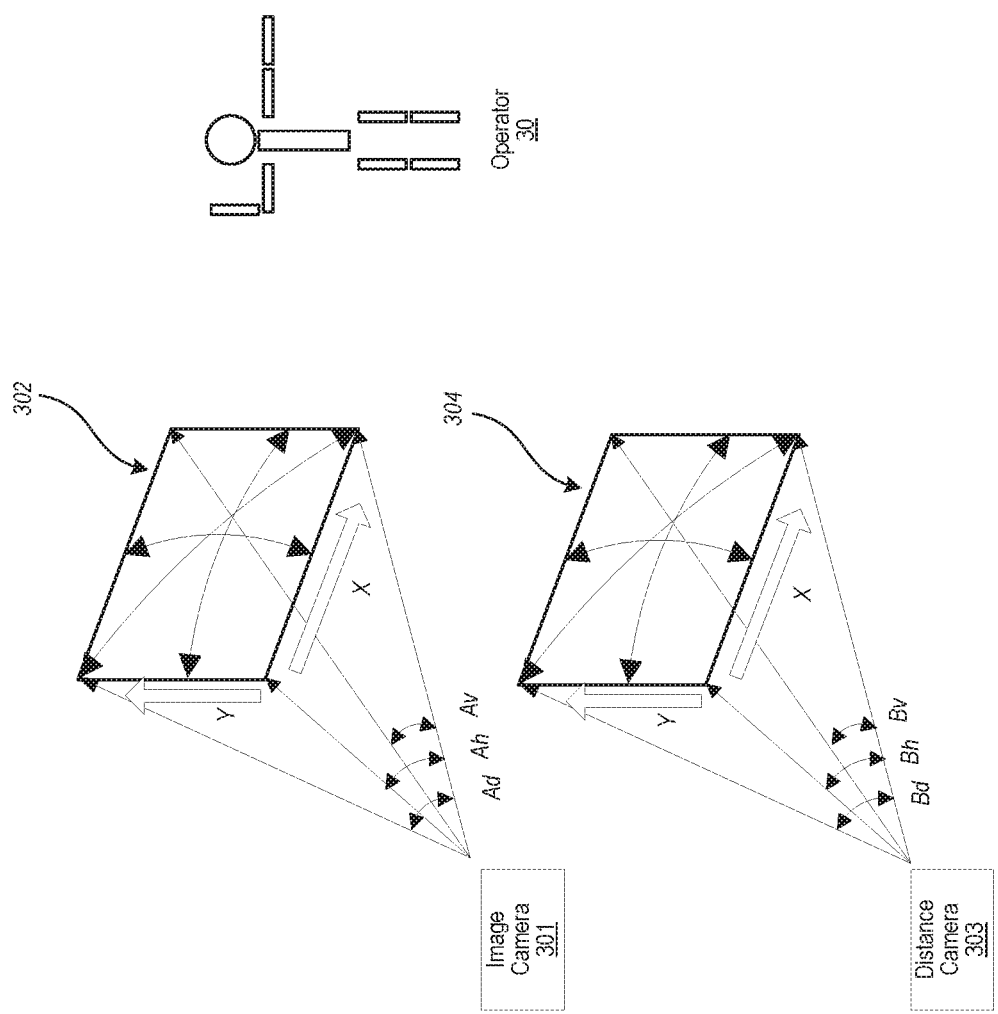
FIG. 3A is a partially schematic diagram illustrating angles of view of an image camera and a distance camera in accordance with representative embodiments of the present technology.

FIG. 3A is a schematic diagram illustrating angles of view for an image camera 301 and a distance camera 303 in accordance with representative embodiments of the present technology. In particular embodiments, the image camera 301 is configured to collect an image 302 (e.g., color images with RGB pixels) of or corresponding to the operator 30. The collected image 302 is generated by the image camera 301 at a first angle of view that can be measured based on a horizontal angle (e.g., angle $A_h$ in FIG. 3A), a vertical angle (e.g., angle $A_v$ in FIG. 3A), or a diagonal angle (angle $A_d$ in FIG. 3A). More particularly, the first angle of view of the image camera 301 for collecting the image 302 decides how the image 302 looks, and where the operator 30 is located in the image 302 (e.g., the operator 30 may be located at the center of the image and occupy a half or a quarter of the total image area of the image 302).

The distance camera 303 (e.g., a device with a distance sensor, such as a ToF sensor) is configured to measure the distance between the distance camera 303 and the operator 30. The measured distance information can be presented as a depth map 304 (e.g., using shadings or colors to indicate the distances between the distance camera 303 and an object measured). The depth map 304 is generated by the distance camera 301 at a second angle of view that can be measured based on a horizontal angle (e.g., angle $B_h$ in FIG. 3A), a vertical angle (e.g., angle $B_v$ in FIG. 3A), or a diagonal angle (e.g., angle $B_d$ in FIG. 3A). More particularly, the second angle of view of the distance camera 303 used to measure the distance decides the size (e.g., the number of pixels, depending on a resolution of the depth map) of the depth map 304 and where the operator 30 is located in the depth map 304.

In particular embodiments shown in FIG. 3A, the image camera 301 and the distance camera 303 are positioned at generally the same location (e.g., adjacent to each other, or located together in a same device such as the image camera 131 described above with reference to FIG. 1), and the first angle of view and the second angle of view are at least approximately the same. Accordingly, the collected image 302 and the depth map 304 can have generally the same coordinate axes (e.g., X axis and Y axis shown in FIG. 3A) which are used to identify the pixels of the collected image 302 and the depth map 304. For example, based on a given location in the collected image 302 (e.g., pixels corresponding to a gesture), the corresponding depth information (e.g., depth information corresponding to the gesture) can be quickly retrieved. Similarly, based on a given location in the depth map 304, the corresponding image portion in the collected image 302 can be conveniently obtained.

In some embodiments, the first angle of view and the second angle of view do not need to be generally the same. In such embodiments, the coordinates of the collected image 302 and the depth map 304 can be related or associated (e.g., via a transformation) such that they can be cross-referenced. In some embodiments, the coordinates of the collected image 302 and the depth map 304 can be related or associated based on the following equation.

$$\begin{pmatrix} u_2 \\ v_2 \\ 1 \end{pmatrix} = \alpha K_2 R \left( K_1^{-1} \begin{pmatrix} u_1 \\ v_1 \\ 1 \end{pmatrix} + T \right) \quad \text{Eqn-(1)}$$

In Equation (1) above, $(u_1, v_1)$ are the coordinates of the collected image 302, and $(u_2, v_2)$ are the coordinates of the depth image 304. Parameters $K_1$ and $K_2$ are internal reference matrixes. Parameters R and T are coefficients representing the rotation and the translation of the distance camera 303 relative to the image camera 301. Parameter a is a ratio parameter. In the equation above, parameters $K_1$, $K_2$ and T are fixed and can be calculated based on empirical studies (e.g., by calculating unknown parameters based on a set of known coordinates in the equation). When a cradle angle (an angle indicating a rotation from a horizontal plane; e.g., angle ⊖ in FIG. 3C) is zero, then parameter R is a unit matrix. Based on Equation (1) above, the coordinates of the collected image 302 and the depth image 304 can be related or associated.

In particular embodiments, the present technology can determine how to analyze the collected image 302 and the depth map 304 by analyzing the resolutions of the collected image 302 and the depth map 304 (referred to as a "resolution analysis"). For example, in embodiments for which the collected image 302 has a relatively high resolution that enables the system to initially identify a gesture of the operator 30, the system can first identify the gesture solely based on the collected image 302 and then use the depth map 304 to verify the identified gesture. Similarly, in embodiments for which the depth map 304 has a relatively high resolution that enables the system to initially identify a gesture of the operator 30, the system can first identify the gesture solely based on the depth map 304 and then use the collected image 302 to verify the identified gesture. By this arrangement, the present technology can be implemented by various types of (image or distance) cameras with different resolutions.

Figure 3C:
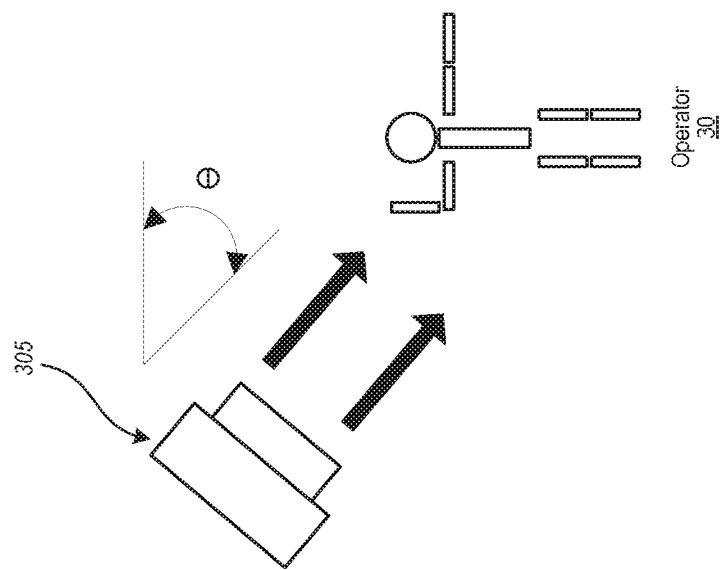
FIGS. 3B and 3C are partially schematic diagrams illustrating a depth image adjustment based on a cradle angle in accordance with representative embodiments of the present technology.
Figure 3B:
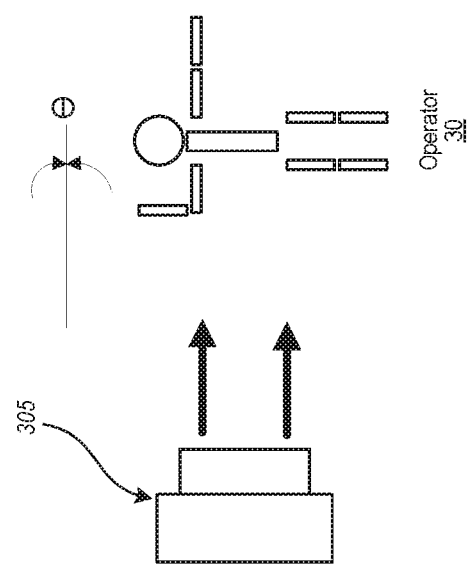

FIGS. 3B and 3C are partially schematic diagrams illustrating a depth image adjustment based on a cradle angle ⊖ in accordance with representative embodiments of the present technology. In FIG. 3B, the cradle angle ⊖ is zero which means an optical axis of a distance camera 305 is parallel to the horizontal plane. In such embodiments, a basic depth image of the operator 30 is generally the same over the entire image of the operator, and thus a depth variance caused by a gesture of the operator 30 can be readily identified. Therefore, for such embodiments, there is no need to perform the depth image adjustment based on the cradle angle ⊖. However, in an embodiment shown in FIG. 3C, the optical axis of the distance camera 305 forms an angle (i.e., the cradle angle ⊖) with the horizontal plane. As a result, when taking a depth image of the operator 30, the basic depth image of the operator 30 is not the same over the entire image of the operator (e.g., it increases from the operator's head to toe) and thus a depth variance caused by a gesture of the operator 30 cannot be readily identified.

The depth image can be adjusted by equation (2) below. A point in the original depth image can be described as P=(u, v, z). Parameter u represents the value of the X coordinate of the depth image (e.g., the X axis shown in FIG. 3A) and parameter v represents the value of the Y coordinate of the depth image (e.g., the Y axis shown in FIG. 3A). Parameter z represents the depth value in the depth map. Parameter S represents Sin ⊖, Parameter C represents Cos ⊖, and parameter f is a coefficient of the rotation matrix. The adjusted point $\tilde{P}$ can be described as (u, v, z'). In other words, the depth value z can be replaced by z', after the depth image adjustment. Without being bonded by theory, it is believed that the depth image adjustment provides a better result for identifying a gesture in the depth image than those without the depth image adjustment.

$$\tilde{P} = \begin{pmatrix} u \\ v \\ z' \end{pmatrix} = \begin{pmatrix} u \\ v \\ -\frac{sv}{f} + cz \end{pmatrix} \quad \text{Eqn-(2)}$$

Figure 3E:
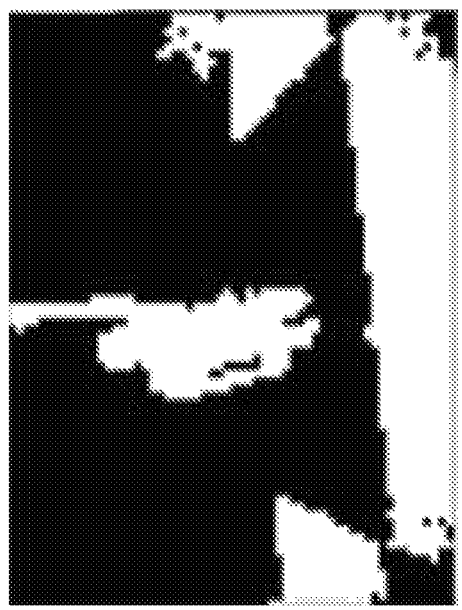
FIGS. 3D and 3E are screenshot diagrams illustrating a difference between depth images with and without a depth image adjustment based on a cradle angle.
Figure 3D:
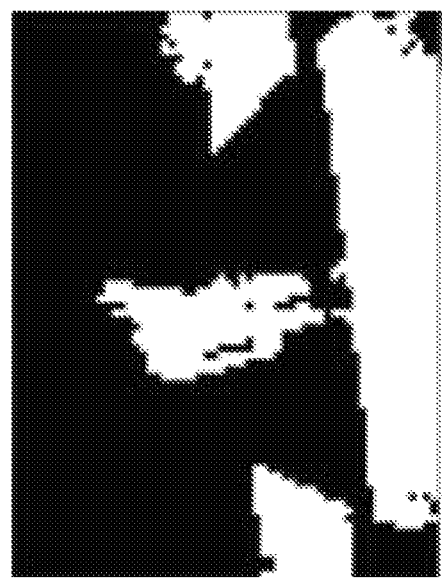

FIGS. 3D and 3E show an image before and after the depth image adjustment has been performed. FIG. 3D is an original depth map without the depth image adjustment, and FIG. 3E is an adjusted depth map with adjusted depth values (e.g., z'). FIG. 3D/3E is determined in the depth map based on a threshold depth value. For example, FIG. 3D/3E is composed of pixels ranging from a lower depth threshold value ($D_{min}$) to an upper threshold depth value ($D_{max}$). As shown, an arm gesture of an operator in FIG. 3E is much clearer than it is in FIG. 3D.

Figure 4A:
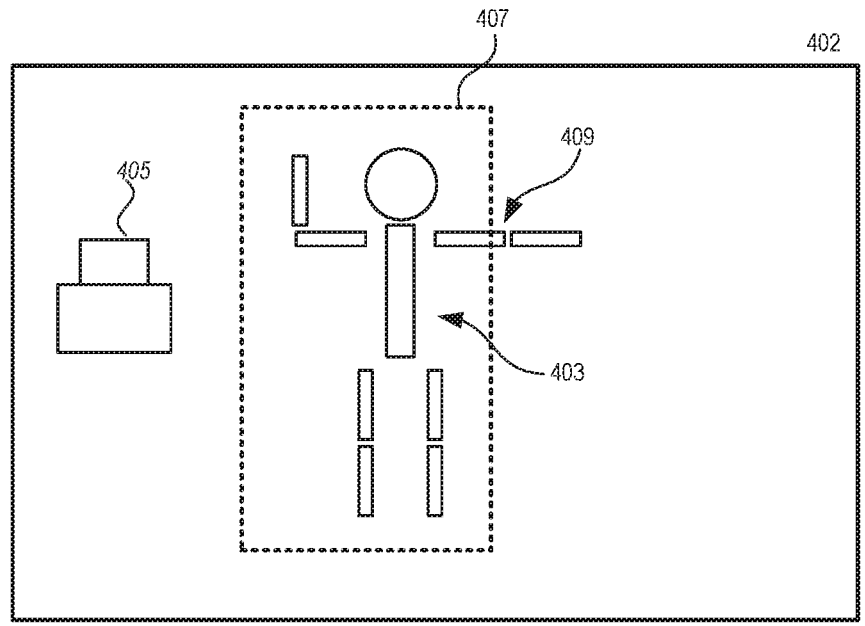
FIG. 4A is a partially schematic diagram illustrating an image collected by an image-collection component in accordance with representative embodiments of the present technology.
Figure 4B:
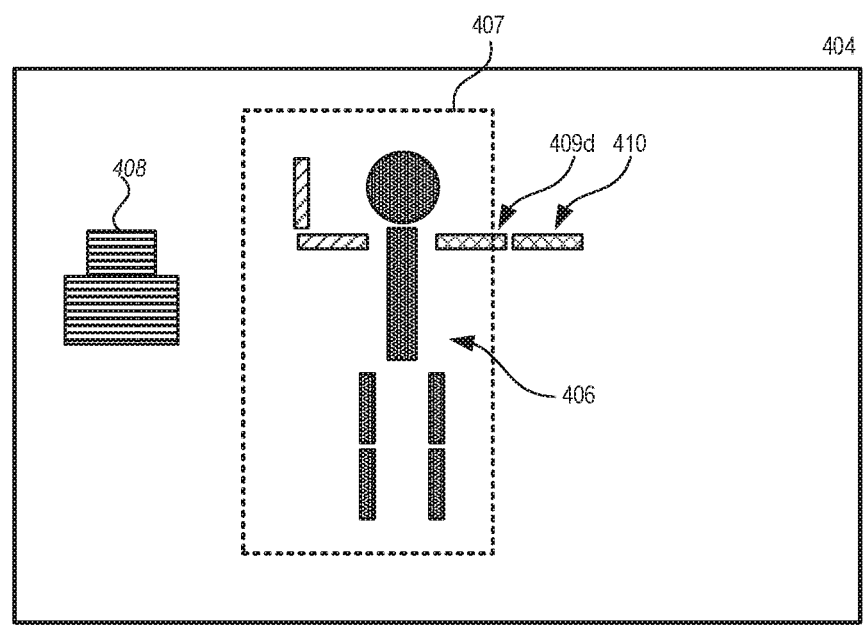
FIG. 4B is a partially schematic diagram illustrating an image created by the distance-measurement component in accordance with representative embodiments of the present technology.

FIGS. 4A and 4B are partially schematic diagrams illustrating images collected by the image-collection component and the distance-measurement component in accordance with representative embodiments of the present technology. FIG. 4A illustrates a color image 402 having an image portion 403 corresponding to an operator (e.g., the operator 20 or 30 shown above) and a background image portion 405. FIG. 4B illustrates a depth map 404 having a depth image portion 406 corresponding to the operator and a background image portion 408. Note that different shadings in the depth map 404 reflect different distances between a distance camera and a measured object (e.g., the operator, a background structure, etc.). The coordinates of the color image 402 and the depth map 404 are related or associated (as discussed above) so that they can be readily cross-referenced.

As shown in FIGS. 4A and 4B, the image portion 403 can be identified in the color image 402 by a bounding box 407. In some embodiments, the associated system (e.g., system 200) can position (or overlap) the bounding box 407 on the color image 402 such that at least a portion of the image portion 403 corresponding to the operator can be surrounded by the bounding box 407. The system can then identify a body part (e.g., a shoulder joint or an arm) of the operator in the color image 402 by identifying an intersection 409 between the image portion 403 and the bounding box 407. The system can identify a gesture based on the intersection 409.

In particular embodiment, the bounding box 407 has a rectangular shape. In some embodiments, the bounding box 407 can have an elliptical shape. In other embodiments, the bounding box 407 can have a different shape such as a square, circle, etc. In some embodiments, the bounding box 407 can be generated based on a user input (e.g., a user identifies an operator from multiple candidates through a user interface). In some embodiments, the bounding box 407 can be generated by the system based on an analysis of the color image 402 (e.g., so as to automatically recognize an image portion associated with a human operator wearing a specific type of clothes). In some embodiments, the system can perform an object analysis (e.g., to have a general idea of which shape is preferable for the object to be analyzed) and then determine the type of the bounding box 407 (e.g., select a vertical rectangular-shaped bounding box for a standing human operator).

Once the intersection 409 is identified, the system can go to the depth map 404 and obtain the depth information corresponding to the operator (e.g., an arm depth-image portion 410). The system can further identify other body parts (e.g., head, shoulder, hand, joint, etc.) of the operator based on relative locations of these body parts and corresponding depth analysis. Accordingly, by cross-referencing the color image 402 and the depth map 404, the system can effectively identify various types of bodily gestures of the operator. In other embodiments, the system can initially position the bounding box 407 on the depth map 404 and then obtain the image of a gesture in the color image 402 in a manner similar to those discussed above.

In some embodiments, for example, the system can first use the color image 202 to identify the bounding box 407 (e.g., without identifying the intersection 409 in the color image 202). The system can "map" the identified bounding box 407 to the depth map 404, and then identify an intersection 409d between the depth image portion 406 and the bounding box 407. The system can then identify a gesture based on the intersection 409d. In particular embodiments, the intersection 409 can represent a shoulder joint of the operator. Once the system locates the shoulder joint of the operator, the system can further locate other body parts based at least in part on analyzing the depth image portion 406. In particular embodiments, the system can determine a center point of the operator based on the depth information corresponding to the depth image portion 406 or the bounding box 407. For example, the system can determine the center point of the operator by averaging the coordinates of the depth pixels corresponding to the depth image portion 406 in the upper-two-third portion of the bounding box 407. After the center point of the operator is determined, the system can then determine other body parts (e.g., head, arm, hand, etc.) of the operator based on their relative locations to the center point. Once these body parts are located, the system can then identify corresponding gestures based on associated image and distance information.

In some embodiments, the system can determine the depth image portion 406 corresponding to the operator in the depth map 404 based on a threshold depth value. For example, the system can deem the pixels ranging from a lower depth threshold value ($D_{min}$) to an upper threshold depth value ($D_{max}$) as the depth image portion 406 corresponding to the operator. In some embodiments, the lower and upper depth threshold values can be determined based on various factors, such as the characteristic of the ToF sensor, background depth information, measuring environment, etc.

In some embodiments, $D_{min}$ and $D_{max}$ can be determined based on equation (3) and equation (4) below. $D_{body}$ represents a representative depth of the operator. In some embodiments, $D_{body}$ can be obtained based on the determined center point of the operator in a depth map (e.g., the system can look up the depth information in the depth map corresponding to the determined center point to obtain $D_{body}$). In some embodiments, $D_{body}$ can be obtained by averaging depth information corresponding to the depth image portion 406 or the bounding box 407 (or a portion thereof). The length unit used in equation (3) and (4) is meter. The parameter "0.4" is determined based on empirical studies regarding an average depth of a human body. The parameter "0.5" can vary depending on the types of the distance sensor in the system.

$$D_{min} = \max(0, D_{body} - 0.4) \quad \text{Eqn-(3)}$$

$$D_{max} = \min(5, D_{body} + 0.4) \quad \text{Eqn-(4)}$$

FIG. 5 is a partially schematic diagram illustrating gestures associated with an operator 50 in accordance with representative embodiments of the present technology. As shown in FIG. 5, the gestures associated with the operator can include an arm gesture 501, a head gesture 503, a shoulder gesture 505, a joint gesture 507, a hand gesture 509, a finger gesture 510, a leg gesture 511, a foot gesture 513, or a combination of two or more of any of the above gestures. For example, the operator 50 can form a combined gesture by using both his right arm and left leg.

Figure 6:
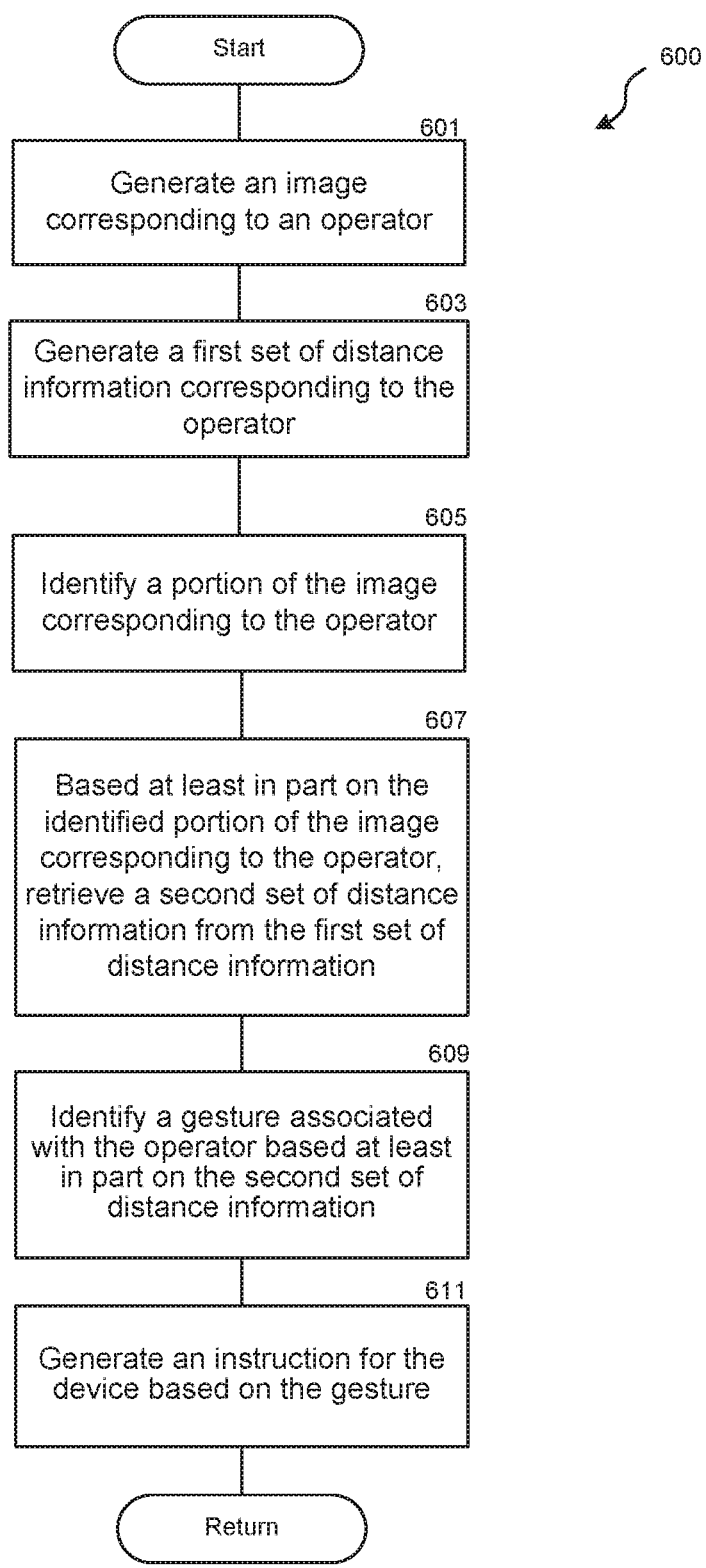
FIG. 6 is a flowchart illustrating embodiments of a method for controlling a moveable device in accordance with representative embodiments of the present technology.

FIG. 6 is a flowchart illustrating a method 600 for controlling a moveable device in accordance with representative embodiments of the present technology. The method 600 can be initiated by a request from an operator. At block 601, the method generates an image corresponding to (e.g., depicting) the operator. Block 603 includes generating a first set of distance information corresponding to the operator. In some embodiments, the first set of distance information can be a depth map image. At block 605, the method 600 continues by identifying a portion of the image corresponding to the operator. In some embodiments, the portion of the image corresponding to the operator can be an image of a body part of the operator, an image of the operator, a contour of the operator or the operator's body part, a board line or frame of the operator or the operator's body part, etc.

The method 600 then retrieves, at block 607, a second set of distance information from the first set of distance information, based at least in part on the identified portion of the image corresponding to the operator. In some embodiments, the second set of distance information can be a portion of a depth map image associated with the operator. For example, the second set of distance information can be a body-frame distance-image portion, an arm distance-image portion, an arm-joint distance-image portion, a shoulder distance-image portion, a hand distance-image portion, other suitable body part distance-image portion, or a combination thereof.

At block 609, the method 600 identifies a gesture associated with the operator based at least in part on the second set of distance information. In some embodiments, the gesture can be a limb, an arm gesture, a hand gesture, a finger gesture, or a combination thereof. At block 611, the method 600 generates an instruction for the device based on the gesture. The method 600 then returns.

Figure 7:
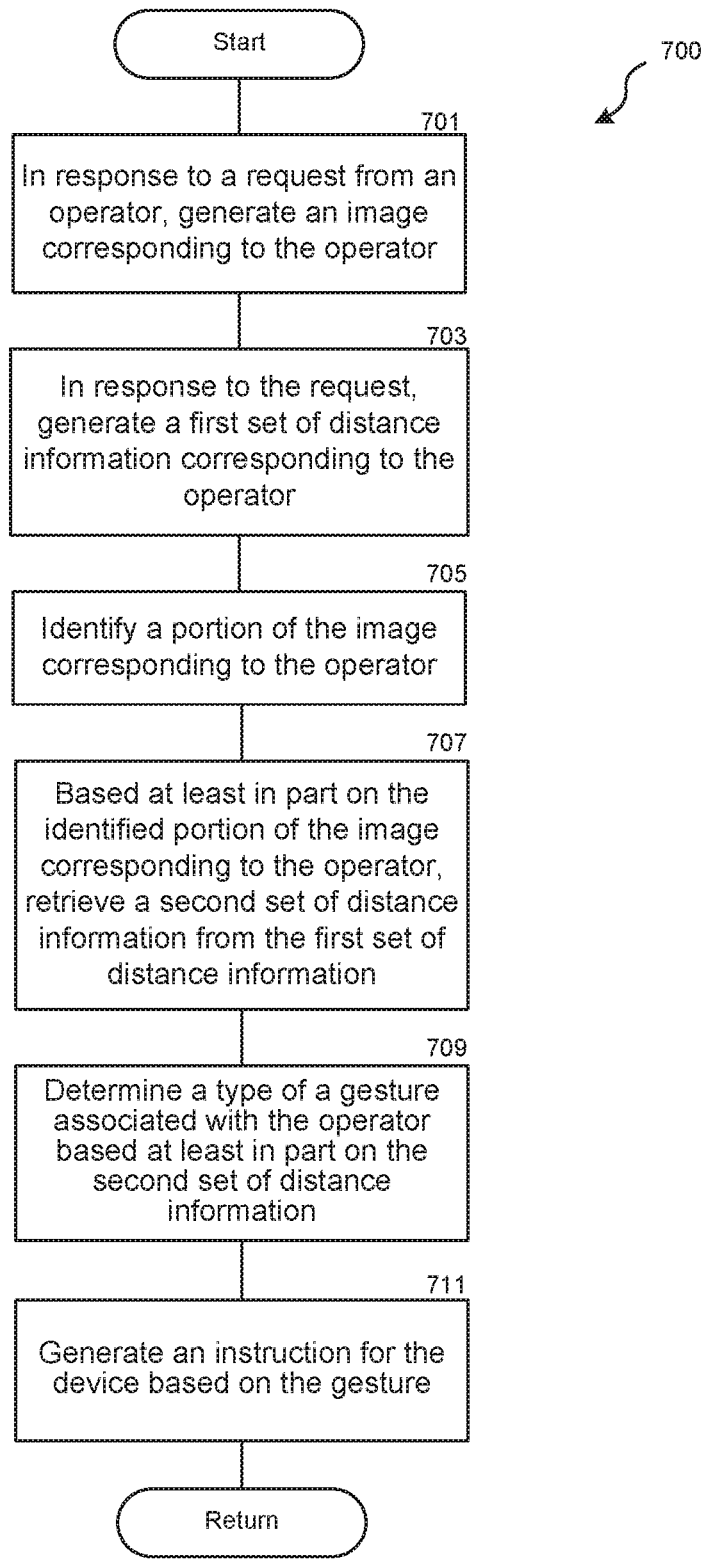
FIG. 7 is a flowchart illustrating embodiments of another method for controlling a moveable device in accordance with representative embodiments of the present technology.

FIG. 7 is a flowchart illustrating embodiments of another method 700 for controlling a moveable device in accordance with representative embodiments of the present technology. At block 701, the associated system (e.g., system 200) generates, in response to a request from an operator, an image corresponding to the operator. At block 703, the system further generates, in response to the request, a first set of distance information corresponding to (e.g., depicting) the operator. The method 700 continues at block 705 by identifying a portion of the image corresponding to the operator. At block 707, the system retrieves a second set of distance information from the first set of distance information, at least partially based on the identified portion of the image corresponding to the operator.

At block 709, the system determines a type of a gesture associated with the operator based at least in part on the second set of distance information. In some embodiments, the type of the gesture can be determined based at least in part on a comparison with a pre-exiting dataset. Further, at block 711, the system generates an instruction for the device based on the gesture. In some embodiments, the instruction can be generated based on a machine learning process. The method 700 then returns.

From the foregoing, it will be appreciated that specific embodiments of the technology have been described herein for purposes of illustration, but that various modifications may be made without deviating from the technology. For example, particular embodiments were described above in the context of moveable device. In other embodiments, the moveable devices can be a different suitable device that includes a UAV.

Further, while advantages associated with certain embodiments of the technology have been described in the context of those embodiments, other embodiments may also exhibit such advantages, and not all embodiments need necessarily exhibit such advantages to fall with within the scope of the present technology. Accordingly, the present disclosure and associated technology can encompass other embodiments not expressly shown or described herein.

At least a portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

We claim:

1. A method for controlling a device having an image collector coupled to a processor and a distance measurer coupled to the processor, comprising:

generating, by the image collector, an image corresponding to an operator;

generating, by the distance measurer, a first set of distance information corresponding to the operator;

identifying a portion of the image corresponding to the operator;

adjusting the first set of distance information of the operator based at least in part on a cradle angle associated with the image collector;

based at least in part on the identified portion of the image corresponding to the operator, retrieving a second set of distance information from the first set of distance information;

identifying a gesture associated with the operator based at least in part on the second set of distance information; and generating an instruction for the device based at least in part on the gesture.

2. The method of claim 1, further comprising determining, based at least in part on the first set of distance information, a distance between the operator and the device.

3. The method of claim 2, further comprising, in response to the distance being greater than a pre-determined threshold value, analyzing the second set of distance information to identify an arm gesture associated with the operator.

4. The method of claim 3, further comprising identifying the arm gesture based on at least one of (a) a body-frame distance-image portion associated with the operator, wherein the body-frame distance-image portion is determined based at least in part on the second set of distance information, (b) an arm-joint distance-image portion associated with the operator, wherein the arm-joint distance-image portion is determined based at least in part on the second set of distance information, (c) a shoulder distance-image portion associated with the operator, wherein the shoulder distance-image portion is determined based at least in part on the second set of distance information, or (d) a hand distance-image portion associated with the operator, wherein the hand distance-image portion is determined based at least in part on the second set of distance information.

5. The method of claim 2, further comprising, in response to the distance being less than a pre-determined threshold value, analyzing the second set of distance information so as to identify a hand gesture associated with the operator.

6. The method of claim 5, further comprising identifying the hand gesture based at least in part on a finger distance-image portion associated with the operator, wherein the finger distance-image portion is determined based at least in part on the second set of distance information.

7. The method of claim 1, wherein the portion of the image corresponding to the operator is identified based at least in part on a bounding box positioned relative to the image of the operator.

8. The method of claim 7, wherein the gesture associated with the operator is a limb gesture, and wherein the method further comprises identifying the limb gesture based at least in part on the bounding box.

9. The method of claim 1, further comprising at least one of:
(a)
determining an angle of view of the generated image of the operator; and
generating the first set of distance information of the operator based at least in part on the angle of view, or
(b)
determining an angle of view of the generated first set of distance information of the operator; and
generating the image of the operator based at least in part on the angle of view.

10. The method of claim 1, further comprising:
determining a first resolution of the image collector;
determining a second resolution of the distance measurer;
based at least in part on the first resolution and the second resolution, generating a resolution-analysis result; and
based at least in part on the resolution-analysis result, generating a relationship between the image of the operator and the first set of distance information.

11. The method of claim 1, wherein the device includes an unmanned aerial vehicle.

12. The method of claim 1, further comprising verifying the identified gesture prior to generating the instruction for the device, wherein verifying the identified gesture prior to generating the instruction for the device includes:
storing at least one of (a) a plurality of image frames associated with the identified portion of the image or (b) a plurality of distance-image frames associated with the second set of distance information; and
analyzing at least one of (a) the individual image frames for consistency with each other or (b) analyzing the individual distance-image frames for consistency with each other.

13. An apparatus, comprising:
a processor;
an image collector coupled to the processor;
a distance measurer coupled to the processor; and
a non-transitory computer-readable medium coupled to the processor and programed with instructions, when executed, cause the processor to:
in response to a request from an operator, generate, by the image collector, an image corresponding to the operator;
in response to the request, generate, by the distance measurer, a first set of distance information corresponding to the operator;
identify a portion of the image corresponding to the operator;
adjust the first set of distance information of the operator based at least in part on a cradle angle associated with the image collector;
based at least in part on the identified portion of the image corresponding to the operator, retrieve a second set of distance information from the first set of distance information;
determine a type of a gesture associated with the operator based at least in part on the second set of distance information; and
generate an instruction for the apparatus based at least in part on the gesture.

14. The apparatus of claim 13, wherein the type of the gesture includes one of the following: a hand gesture, a limb gesture, or a body gesture.

15. The apparatus of claim 13, wherein the instructions, when executed, further cause the processor to:
analyze the second set of distance information to generate an analysis result by at least one of a training classifier, a finite state machine, or a training component using a random forest calculation.

16. The apparatus of claim 13, wherein the instructions, when executed, further cause the processor to:
determine, based at least in part on the first set of distance information, a distance between the operator and the apparatus; and
identify the gesture associated with the operator based at least in part on the distance.

17. The apparatus of claim 13, wherein the portion of the image corresponding to the operator is identified based at least in part on a bounding box positioned relative to the image of the operator, wherein a shape of the bounding box is determined based on at least one of a user input or an object analysis of the image of the operator.

18. The apparatus of claim 13, wherein the instructions, when executed, further cause the processor to:
store the type of the gesture in a storage; and
transmit the type of the gesture to a remote device.

19. An apparatus for controlling an unmanned aerial vehicle (UAV), comprising:
a processor;
an image collector coupled to the processor;
a distance measurer coupled to the processor; and
a non-transitory computer-readable medium coupled to the processor and programmed with instructions that, when executed, cause the processor to:
in response to a request from an operator, generate, by the image collector, an image corresponding to the operator;
in response to the request, generate, by the distance measurer, a first set of distance information corresponding to the operator;
identify a portion of the image corresponding to the operator;
adjust the first set of distance information of the operator based at least in part on a cradle angle associated with the image collector;
based at least in part on the identified portion of the image corresponding to the operator, retrieve a second set of distance information from the first set of distance information;
identify a gesture associated with the operator at least in part on the second set of distance information; and
generate an instruction for controlling the UAV based at least in part on the gesture.

20. The apparatus of claim 19, wherein the instructions, when executed, further cause the processor to:
determine, based at least in part on the first set of distance information, a distance between the operator and the UAV.

21. The apparatus of claim 20, wherein the gesture is identified based as least in part on the distance.

* * * * *